Sept. 8, 1964     D. C. BEHNER     3,148,230
REFRACTORY STRUCTURE

Filed Dec. 5, 1961     2 Sheets-Sheet 1

INVENTOR.
DONALD C. BEHNER
BY *Watts & Fisher*
ATTORNEY

INVENTOR.
DONALD C. BEHNER
BY
ATTORNEY

3,148,230
REFRACTORY STRUCTURE
Donald C. Behner, Parma Heights, Ohio, assignor to North American Refractories Co., a corporation of Delaware
Filed Dec. 5, 1961, Ser. No. 157,145
10 Claims. (Cl. 264—30)

The invention relates to refractory furnace walls and more particularly to a method of and structure for repairing the refractory furnace walls.

In furnace construction, refractory bricks are laid crosswise so that the ends of the bricks form the inside and outside surfaces of the furnace wall. The inner ends of these bricks forming the inside surface of the wall, then, define the perimeter of the furnace heat chamber. Since the inner ends of the bricks are exposed to the heat chamber, a brick inner end is often called the "hot" end. The opposite end of the brick forming a part of the outside wall surface is relatively cooler and called, therefore, the "cold" end.

As the furnace runs through its various cycles of operation, the hot end of the brick is thermally cracked through repeated heating and cooling causing it to alternately expand and contract. This thermal shock causes the brick to eventually fracture near its hot end. Fractures caused in this manner are referred to as "thermal spalling." This spalling results in the gradual deterioration and falling away of pieces of the refractory from the brick hot ends. The destructive spalling process will continue until ultimately there is a furnace failure.

In order to limit spalling it has become standard practice in the construction of the furnace enclosures to use bricks clad on four sides with metal. When the furnace is first put into use, the thin sheet metal cladding the brick oxidizes and bonds the many refractory bricks together into a unitary structure. These metal clad bricks are only resistive to spalling and the cladding does not by any means eliminate it entirely. Eventually, the hot end of a metal clad brick also fractures and breaks away until a thin spot begins to appear. A thin spot in a furnace is easily identifiable because the cold end will glow red in that area.

The appearance of a red glowing area is a vivid visual indication that a furnace is losing excess heat and that the useful life of the furnace is nearing an end. If nothing is done to repair the furnace it will soon fail and require a long shut down and costly rebuilding.

The invention provides a special structure which may be used to quickly and economically repair thin areas. By using the novel structure of the invention both the efficiency and the useful life of a refractory furnace are increased.

The novel repair structure of the invention comprises a cellular structure which may be mounted adjacent the cold end surface of a new or existing furnace installation. The invention contemplates using the cellular structure to support basic refractory material which may be sprayed or otherwise added to the cold end surface of those bricks in the thin spot areas as those areas develop. The cellular structure may also be used to form a furance wall "in situ."

This spalling problem cannot be solved well by the expedient of using longer bricks. For furnace efficiency and life, the thickness of a furnace wall should be maintained at an optimum thickness. If the enclosure surface is made thicker so that more insulation is achieved, the hot ends of the bricks become too hot and burn away too rapidly. If the wall is too thin, the furnace becomes weak and inefficient. It is, therefore, desirable to maintain the furnace wall at a certain critical thickness where some balance between heat dissipated and heat retained is reached.

Spraying additional refractory material against the cold ends of the bricks as contemplated by the invention enables these critical dimensions to be maintained. Thus, it eliminates any danger of a wall burning through in a thin area so that the furnace has to be shut down for a costly rebuilding and the production of the furnace is not lost.

With the present construction a cellular metal structure is provided. This structure defines a plurality of open ended rectangular compartments each of which is, in cross section, of a dimension approximately corresponding to the dimension of the cross section of a refractory brick. In use, this cellular structure is either used as a repair structure or to build a wall "in situ." If used as a repair structure it is positioned adjacent the outside or cold end surface of a refractory wall.

When a thin spot in the refractory wall is to be repaired by the application of additional refractory material to the cold ends of the bricks, the cellular structure serves a multiple purpose. The structure serves as a mold and support for the material applied for repair. The structure also serves to mask off areas where additional and repair refractory is not desired or required. When using the cellular structure as a mold and mask it is possible to apply repair refractory material in all areas where it is required but only where required and only to the extent needed. This permits the entire wall to be maintained in the desired and required optimum thickness without fear of the overheating of the inner wall which can and will result if the wall is either too thick or too thin. At the same time, inefficiency and possible furnace failure due to wall thinness or a hole completely through the wall is prevented.

In time other cellulose structures may be positioned adjacent the first and the repair process continued as and where needed. Thus, so long as space permits, the life of the furnace wall is esentially endless because any number of cellular walls may be used.

As previously suggested, the cellular structure of the invention may also be used to form the refractory walls of a new furnace. To construct the furnace wall a cellular framework of appropriate size and depth is erected where the wall is to be located. It is shaped to any desired contour. A sheet of plywood or other suitable form material is placed against one side of the cellular structure to cover one open end of each of the certangular compartments. Refractory material is sprayed into the other open end of each compartment partially completely filling them to form a solid wall. The refractory material is cured by using furnace heat or other convenient and well-known methods.

Thus, the cellular structure provides a fast and economical method for building the walls of a refractory furnace. Not only is a saving made in the construction of the furnace but also in the cost of shipping and handling the construction material. The cellular structure is shipped knocked-down so as to occupy minimum space. The refractory material is shipped in bulk by the most economical method.

Accordingly, a principal object of this invention is to provide a cellular structure by means of which the enclosure surfaces of a refractory furnace may be built and/or repaired so as to lengthen the useful life of the furnace.

Another object of this invention is to provide a cellular structure to mold and support repair refractory material sprayed against the cold end surface of a furnace enclosure surface.

A further object of this invention is to provide a method of quickly and economically constructing the walls of a refractory furnace.

Yet another object of this invention is to provide a cellular structure to be used in constructing the original furnace wall.

Still another object of this invention is to provide a cellular structure for repairing furnace enclosure surfaces which require a minimum amount of space during shipping and handling.

An important object of this invention is to provide a cellular structure in which the structure, especially when only partially filled with refractory material serves to provide high heat dissipation on the cold face of the structure in that the elements of the structure serve as heat dissipating fins.

Other objects and a fuller understanding of the invention may be had by referring to the following description and claims taken in conjunction with the accompanying drawings in which:

Figure 1:
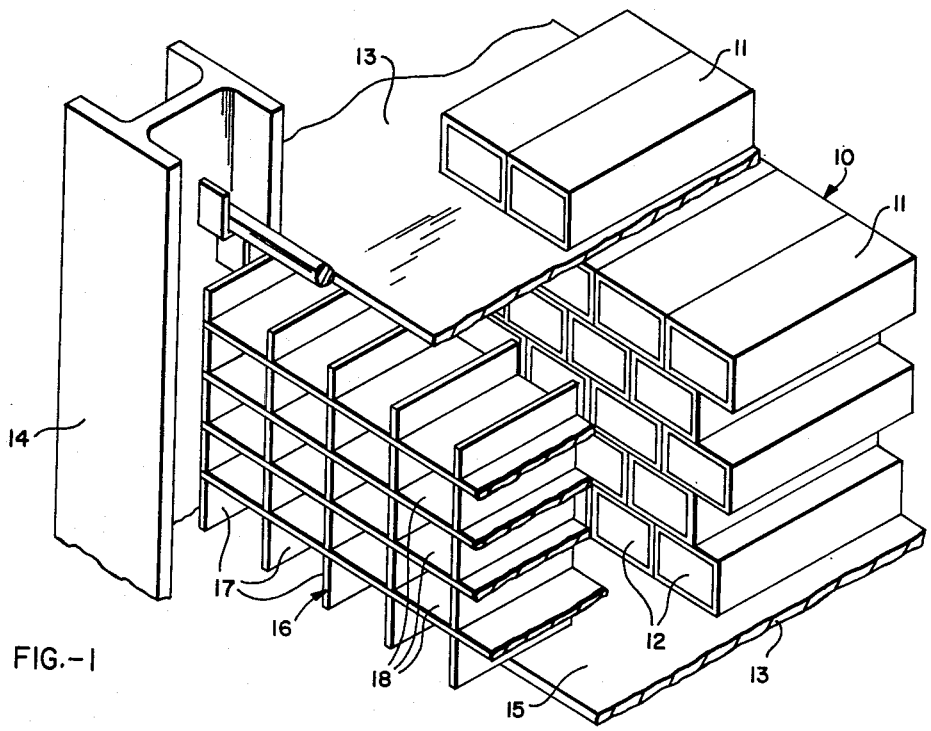
FIGURE 1 is a perspective view of a portion of an incompleted furnace wall with parts in section and removed showing the cellular structure of the invention in an exploded view and about to be positioned against the furnace wall.

Referring now to the drawing and particularly to FIGURE 1, an incomplete portion of a refractory furnace wall is shown generally at 10. The furnace wall 10 comprises a plurality of metal clad brick units 11 laid crosswise in overlapping tiers. A portion of the furnace wall is shown as incomplete rather than in section to facilitate an understanding of the nature of the invention. When the wall is completely finished only the cold end surfaces 12 of the brick units 11 will be seen from outside the furnace.

As will become apparent from the succeeding description, one of the advantages of this invention is that the cellular structure can be tailored to fit any refractory furnace. The succeeding description as directed to the specific furnace shown is only by way of illustration.

In the specific furnace shown, the brick units 11 are laid in groups of several overlapping tiers between several spaced, parallel heavy gauge metal plates 13. The heavy gauge metal plates 13 rigidly secure the groups of brick units 11 to steel column 14 of the structural steel of the refractory furnace. The heavy plates 13 are much greater in their width than are brick units 11 in length so that a portion 15 of each heavy plate 13 extends between the steel column 14 and the cold ends 12 of the brick units 11. The cold ends 12 and the extended portions 15 of the heavy plates 12 form a cavity into which the cellular structure of the invention is placed.

Figure 3:
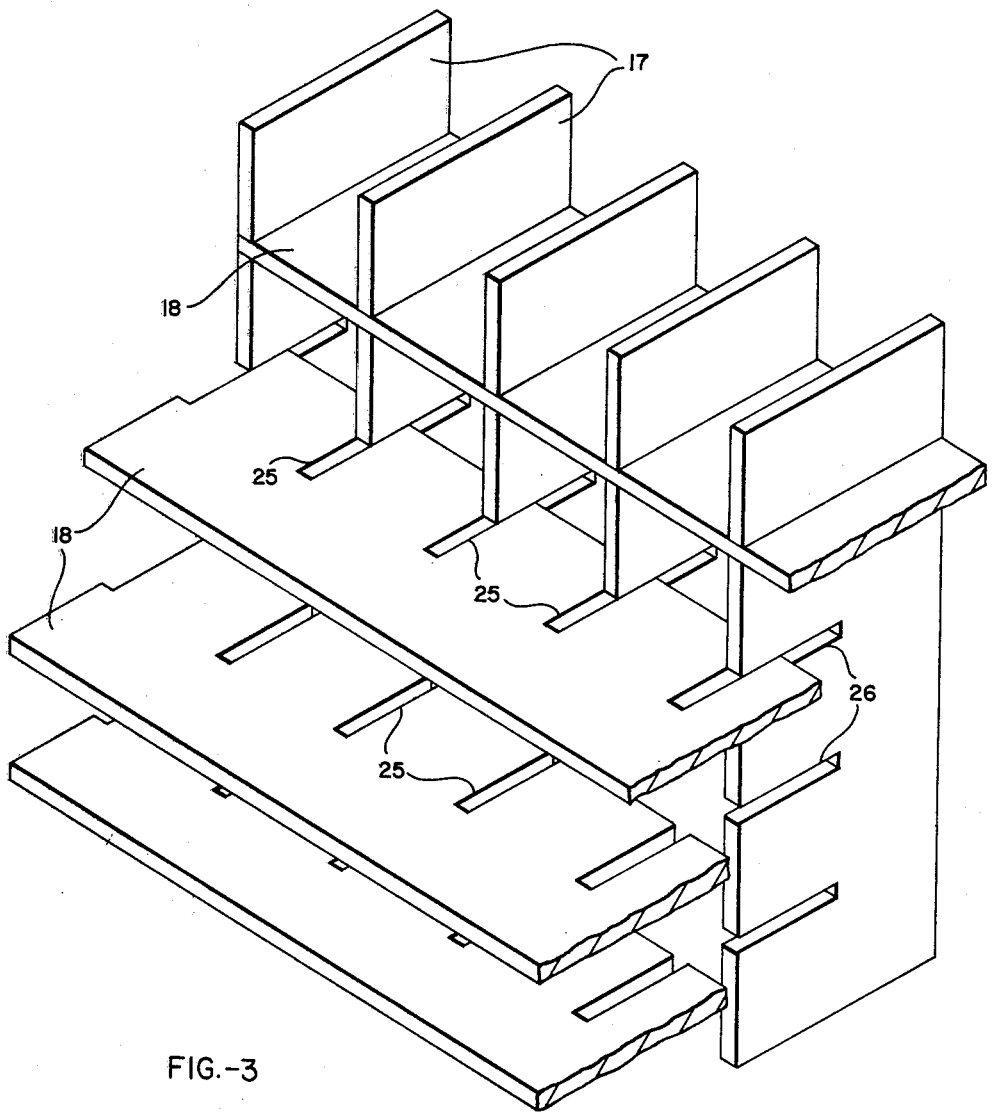
FIGURE 3 is a exploded view of the structure on an enlarged scale.

A cellular structure 16 is shown in exploded form in FIGURE 3 and partially assembled in FIGURE 1. The cellular structure 16 comprises a plurality of vertical, spaced parallel plates 17 and a plurality of horizontal, spaced parallel plates 18. The horizontal plates 18 in their respective spaced parallel planes intersect all of the vertical, spaced parallel plates 17 to form a plurality of identical compartments arranged in a cellular pattern.

At the location where vertical plates 17 intersect the horizontal plates 18, both sets of plates are slotted 25, 26, half way across so that they interfit to form the cellular structure 16. As seen in the drawings, the slots 25 in the horizontal plates 18 extend from the right side of each of the plates 18 to the longitudinal centerline. The slots 26 in the vertical plates 17 extend from the left side of the plate to the longitudinal centerline. The cellular structure is assembled by setting up vertical, spaced parallel plates 17, matching the slots in the horizontal, spaced parallel plates 18 to those in vertical plates 17 and moving sets of plates together until their edges fall into mutual alignment. The plates are welded together to provide a rigid structure.

Because of the nature of the construction of the cellular structure it can be knocked down for shipment to the installation site. This feature enables the cellular structure to be easily handled and economically stored.

Figure 2:
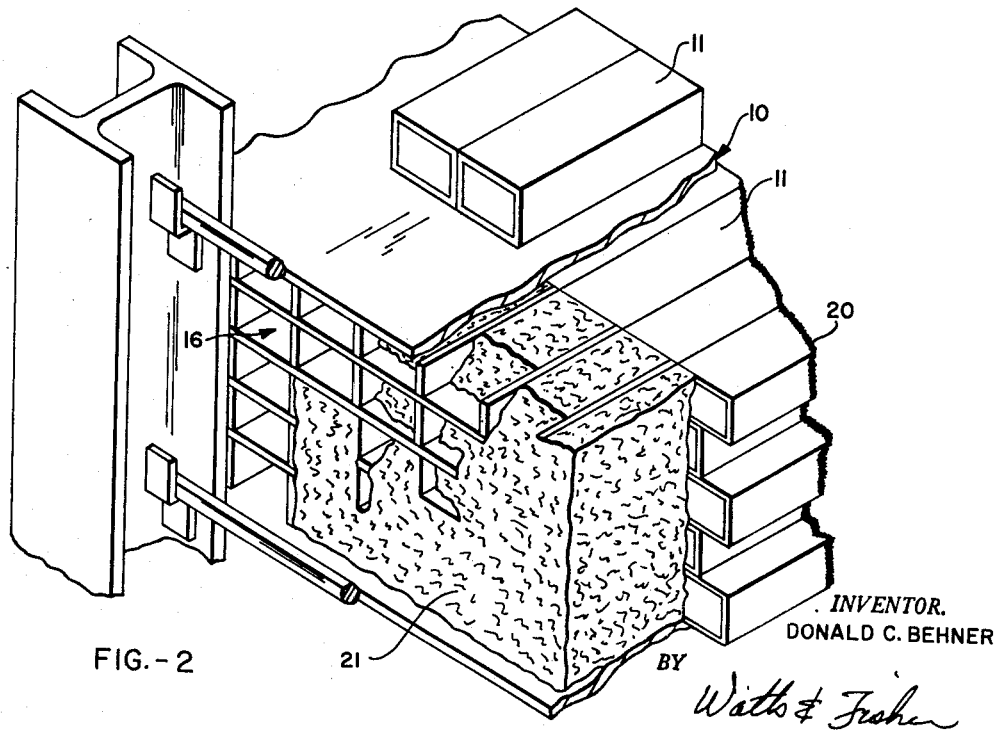
FIGURE 2 is a perspective view of a repaired furnace wall where the assembled cellular structure is positioned against the cold end surface of the furnace wall and filled with repair refractory material.

As shown in FIGURE 2, the cellular structure is in a position against the cold ends of brick units 11 in furnace wall 10. A portion of the furnace wall is shown as having spalled or burned away portions at 20. The furnace wall 10 has been repaired by spraying refractory material 21 into those compartments of cellular structure 16 which abut the thin areas of the wall. Sufficient refractory material 21 is sprayed into the compartment to increase the thickness of the wall 10 such that its effective insulation is comparable to that of the original wall. With the furnace thus repaired it may continue in use without danger of failure. In time even the repaired areas of the furnace wall develop thin spots. A second cellular structure may then be positioned adjacent the first and more refractory material added to again thicken the wall. Each time the repaired wall developes thin spots an additional cellular structure may be positioned against the wall as long as space permits, so the repair operation may be repeated several times to indefinitely lengthen the useful life of the furnace.

The cellular structure 16 may be used to repair existing furnaces as well as incorporated in new installations. Where an existing furnace is to be repaired the cellular structure is readily fabricated to fit among the structural steel of the furnace. In a new furnace installation the repair cellular structure 16 need not be installed during the original construction of the furnace, but may be installed at a later time when the furnace is actually in need of repair. In this manner the original investment in the furnace installation is lowered. Regardless of when the cellular structure is installed, one of the outstanding features of the invention is that the actual cost of the cellular structure and its installation is negligible, especially when compared to the savings obtained by increasing the efficiency and the life span of the furnace.

Another outstanding feature of the invention is that it may be used to quickly and economically construct the original walls of a new furnace. The cellular structure 16 to be used in constructing the wall is shipped to the installation site knocked-down to facilitate handling and economize on storage. Several units of the cellular structure 16 are erected by assembling horizontal and vertical plates 17 and 18. The completed cellular units 16 are welded or otherwise rigidly secured between the heavy plates 13 or otherwise rigidly secured to the column 14 and to the other structural steel of the furnace to tie all the cellular units 16 together as a unitary wall structure. Sheets of plywood or other suitable material are placed against one side of the cellular structure to cover one of the open ends of each of the compartments. Refractory material 21 is then sprayed into or otherwise placed in all of the compartments filling each from covered end out.

Each of the compartments may be filled an equal amount to form a wall of uniform thickness. They may also be filled to different extents to provide a wall of varying thickness. Thus in the latter instance the thickness of the wall may be made to more accurately provide the insulation required for a particular area of the furnace. The sheets act as forms to retain the refractory material in the compartments as it is being sprayed and after the sheets are removed they provide a smooth furnace wall surface. After the sheets are removed the refractory material 21 is cured by heat from the heat chamber of the refractory furnace or other well-known methods.

Thus the invention provides a simple and economical method of and structure for constructing new furnace walls and for repairing dangerous thin areas in the walls of already operating refractory furnaces.

Although the specification describes the invention in great detail, it essentially comprises a cellular structure which is mounted against the cold end surfaces of the brick units in a furnace enclosure surface. The various compartments in the cellular structure are adapted for receiving and formatively retaining refractory material which may be sprayed or otherwise added to the cold end surfaces to thicken the furnace wall and provide insulation which is comparable to that of the original furnace wall. The invention also involves a novel method of constructing the walls of a refractory furnace. The method essentially comprises providing a cellular structure on the wall site, temporarily covering one side of the cellular structure and formatively placing the refractory material into the compartments of the cellular structure until a desired wall thickness is obtained.

What is claimed is:

1. In a refractory furnace the wall enclosure surfaces comprising, a plurality of metal clad refractory bricks laid crosswise in a plurality of tiers, each of said refractory bricks having an inner hot end surface and an outer cold end surface when the furnace is in use, a first refractory molding and retaining assembly including a group of vertical, spaced parallel plates positioned in perpendicular abutting relation to the cold end surfaces of the refractory bricks, the assembly also including a group of horizontal, spaced parallel plates positioned in perpendicular, abutting relation to said cold end surfaces of the refractory bricks and transversely to said vertical plates, said horizontal plates intersecting said vertical plates to form a plurality of rectangular open-ended compartments with one open end in abutting relation to the cold end surfaces of said refractory bricks so that thin areas in the furnace wall may be repaired by formatively placing additional refractory material in those compartments overlying the thin areas of the furnace wall.

2. The method of constructing in situ a wall of a refractory unit having a heat chamber, said method comprising:
   (a) providing a metallic wall structure having a plurality of open-ended compartments in a cellular arrangement;
   (b) erecting such cellular structure on the refractory wall site and throughout the extent of the refractory wall to be constructed;
   (c) placing a cover over one open end of each compartment on an interior side of the wall structure which interior side defines at least a part of the periphery of the heat chamber;
   (d) preparing a mixture of plastic refractory material;
   (e) plastically placing the refractory material in the cellular wall structure by partially filling each compartment through the other open end from the covered end out to a depth providing the desired initial wall thickness but not completely filling each compartment so that additional refractory material may be selectively added to maintain such initial wall thickness as the interior side wears when said refractory unit is in use.

3. The method of constructing in situ a wall of a refractory unit having a heat chamber, said method comprising:
   (a) providing a metallic wall structure having a plurality of open-ended compartments in a cellular arrangement;
   (b) erecting such cellular structure on the refractory wall site and throughout the extent of the refractory wall to be constructed;
   (c) placing a cover over one open end of each compartment; on an interior side of the wall structure which interior side defines at least a part of the periphery of the heat chamber;
   (d) preparing a mixture of plastic refractory material; and,
   (e) plastically placing the refractory material in the cellular wall structure by filling said compartments through their other open ends from their covered ends out to selected depths to provide desired wall thicknesses and varying the thickness of the refractory wall between different wall areas as required by the design and construction of the refractory unit, but not completely filling said compartments so that additional refractory material may be selectively added to maintain such desired wall thicknesses as the interior side wears when said refractory unit is in use.

4. The method of constructing in situ a wall of a refractory unit having a heat chamber, said method comprising:
   (a) providing a plurality of interfitting metal members at the site of the wall to be constructed;
   (b) assembling such metal members on the wall site to erect a cellular wall structure extending throughout the extent of the wall to be constructed and having a plurality of parallel compartments open at first and second ends with all such first open ends defining at least part of the periphery of the heat chamber;
   (c) placing a removable cover over said first open ends of the compartments;
   (d) preparing a plastic mixture of refractory material;
   (e) formatively placing the refractory material in the cellular wall structure by filling said compartments from their covered ends out to selected depths providing the desired wall thicknesses such that the thickness of the initial refractory wall varies between wall areas as required by the design and construction of the refractory unit, but not completely filling each compartment so that additional refractory material may be selectively added to maintain such initial wall thicknesses as the wall wears when said refractory unit is in use;
   (f) removing the cover to expose a continuous interior wall surface formed by the filled first ends of the compartments in the cellular wall structure; and,
   (g) curing the refractory material at least in part by the heat from the refractory unit itself.

5. The method of repairing an existing refractory wall which has diminished from its initial thickness by wearing of its hot side toward its cold side, said method comprising;
   (a) providing a metallic wall structure having a plurality of open-ended compartments in a cellular arrangement;
   (b) positioning the cellular structure against the cold side of the refractory wall with one opening of each compartment against the wall;
   (c) preparing a mixture of refractory material; and,
   (d) formatively placing the refractory material in selected ones of said compartments to at least, partially fill such compartments from the refractory wall out to a depth providing approximately the initial wall thickness.

6. The method of repairing an existing refractory wall which has diminished from its initial thickness by wearing of its hot side toward its cold side, said method comprising:
   (a) providing a plurality of metal members at the site of the refractory wall;
   (b) assembling the plurality of metal members perpendicular to a common plane to form the side walls of a plurality of open-ended compartments arranged in a cellular structure;
   (c) positioning the cellular structure against the cold side of the refractory wall with one opening of each compartment against the wall;

(d) preparing a mixture of refractory material; and,
(e) formatively placing the plastic refractory material in those compartments opposite at least the diminished areas of the refractory wall and filling such compartments from the refractory wall out to a depth adequate to return the refractory wall to substantially its original characteristics such that the metal members forming the plurality of compartments mold and support the refractory material against the diminished wall areas and mask off the wall areas which have not diminished.

7. The method of claim 6 including, in combination:
(f) assembling the plurality of plate members to form cellular structures and modifying said cellular structures to fit within and extend between existing structures securing the refractory wall.

8. In a refractory furnace the wall enclosure surfaces comprising:
(a) a plurality of refractory bricks laid crosswise in a plurality of tiers, each of said refractory bricks having an inner hot end surface and an outer cold end surface when the furnace is in use;
(b) an insulating and repairing means comprising:
(i) first retaining and forming wall means, said first retaining and forming wall means having planar surfaces mounted perpendicular to the cold end surfaces of said refractory bricks;
(ii) a second retaining and forming wall means, said second retaining and forming wall means having planar surfaces mounted perpendicular to the cold end surfaces of said refractory bricks and arranged transversely to the planar surfaces of said first retaining and forming wall means;
(iii) the planar surfaces of said first and second retaining and forming wall means cooperatively forming the side walls of a plurality of mutually adjacent compartments having first and second open ends;
(c) the first open ends of all said compartments being in abutting relation to the cold end surfaces of the refractory bricks so that a thin spot in the refractory wall may be repaired by plastically applying additional refractory material into the second open ends of those compartments necessary to thicken the furnace wall in the thin spot area.

9. In a refractory furnace the wall enclosure surfaces comprising:
(a) a plurality of refractory bricks laid crosswise in a plurality of tiers, each of said refractory bricks have an inner hot end surface and an outer cold end surface when the furnace is in use;
(b) a cellular frame work comprising spaced plates secured together in an inner fitting relation to form the side walls of a plurality of compartments in a cellular arrangement, first and second ends of each compartment being open;
(c) said cellular frame work being mounted with said first open ends of the compartments adjacent the cold end surfaces of the refractory bricks so that a thin spot in the furnace wall may be thickened and repaired by formatively applying refractory material into the second open ends of those compartments opposite the thin spot in the furnace wall.

10. The method of repairing an existing refractory wall which has diminished from its initial thickness by wearing of its hot side towards its cold side, said method comprising:
(a) providing a structure having a plurality of open-ended compartments in a cellular arrangement;
(b) positioning the cellular structure against the cold side of the refractory wall with one opening of each compartment against the wall;
(c) preparing a mixture of refractory material; and,
(d) formatively placing the refractory material in selected ones of said compartments to at least partially fill such compartments from the refractory wall out to a depth providing approximately the initial wall thickness.

References Cited in the file of this patent
FOREIGN PATENTS

| | | |
|---|---|---|
| 16,893 | Great Britain | 1884 |
| 1,184,625 | France | July 23, 1959 |